May 19, 1959  W. E. MYERS  2,887,211
RUG CONVEYOR FOR DRY ROOM
Filed May 20, 1955  9 Sheets-Sheet 1
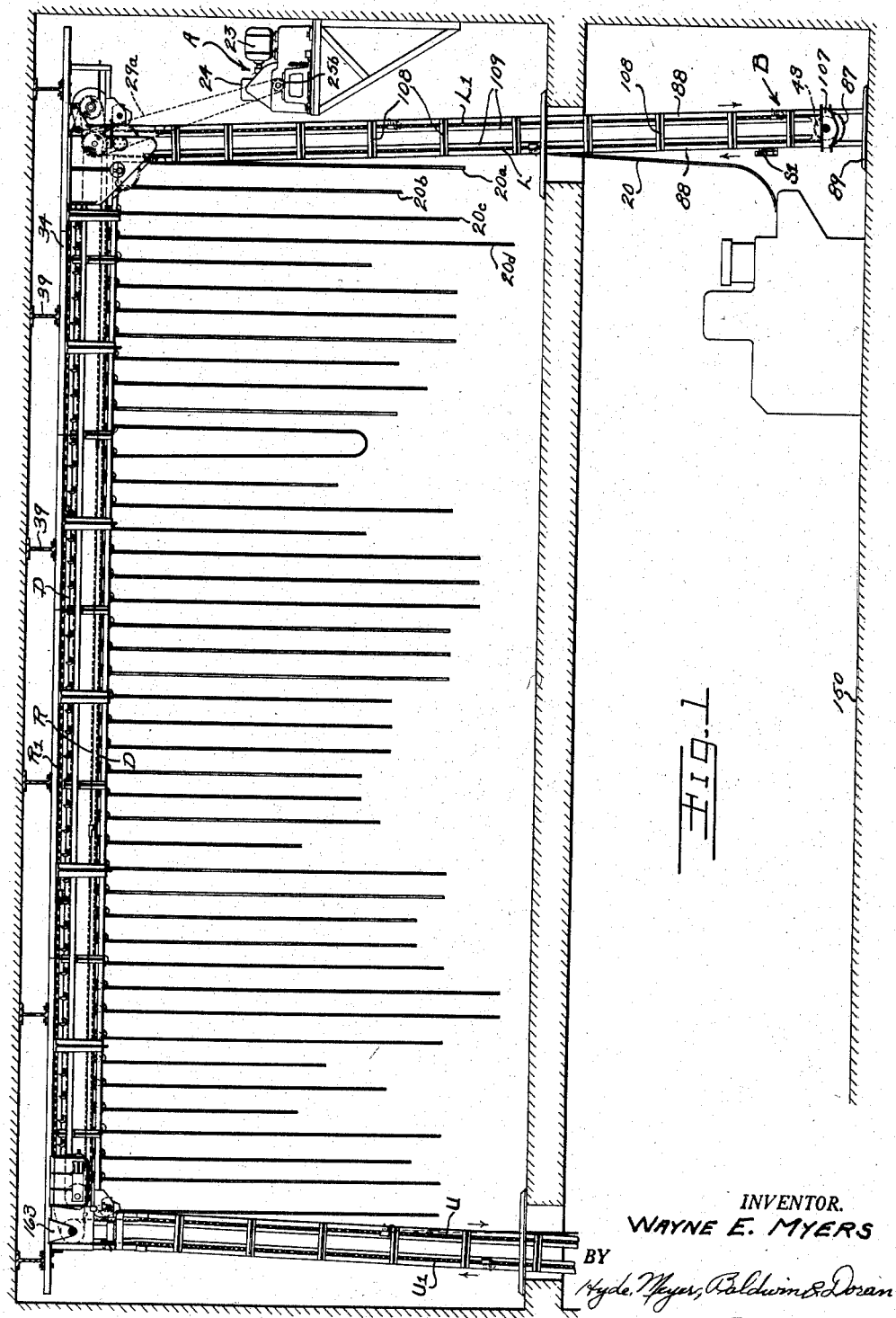
INVENTOR.
WAYNE E. MYERS
BY
Hyde, Meyer, Baldwin & Doran
ATTORNEYS May 19, 1959
W. E. MYERS
2,887,211
RUG CONVEYOR FOR DRY ROOM
Filed May 20, 1955
9 Sheets-Sheet 2
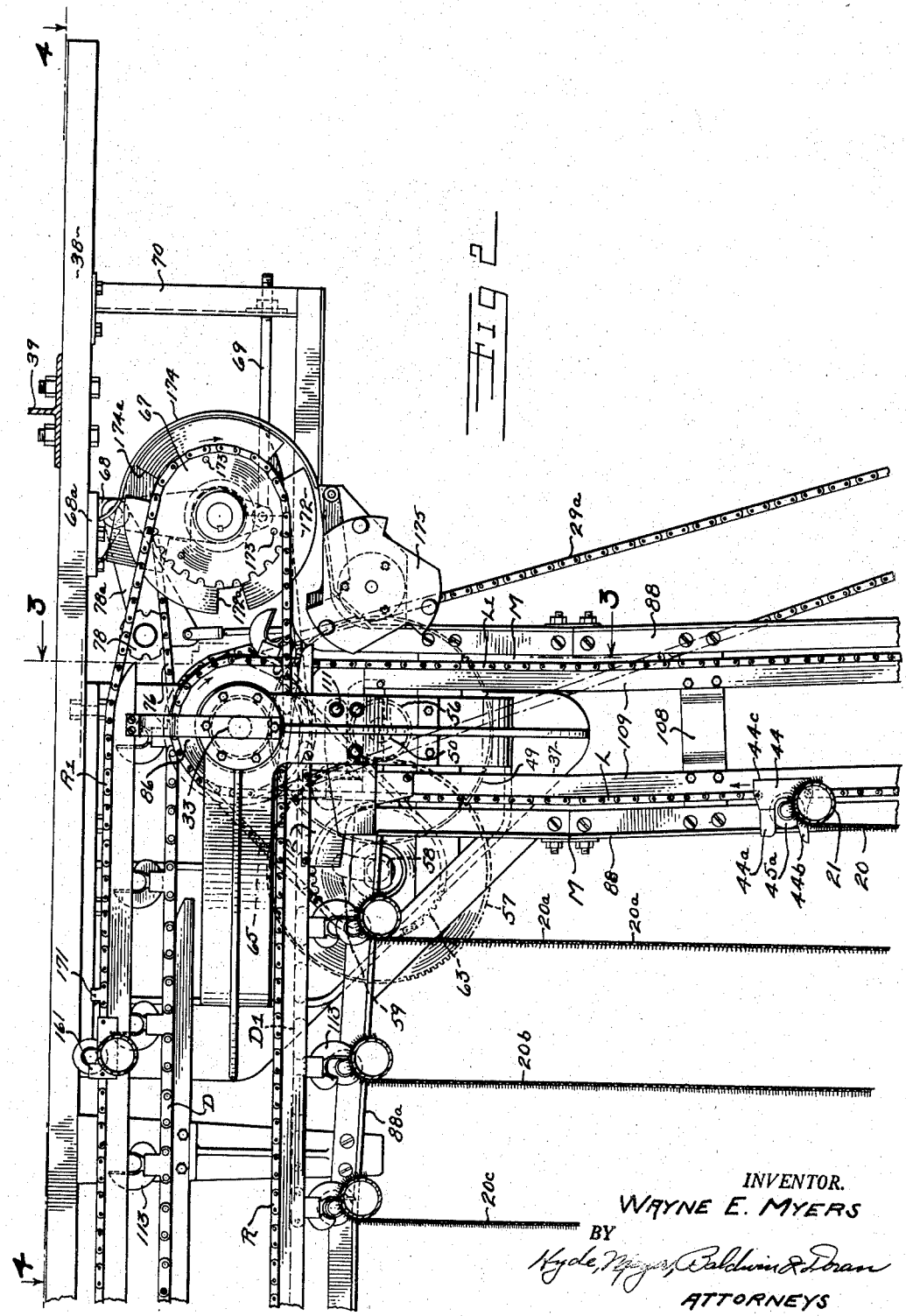
INVENTOR.
WAYNE E. MYERS
BY
ATTORNEYS May 19, 1959  W. E. MYERS  2,887,211
RUG CONVEYOR FOR DRY ROOM
Filed May 20, 1955  9 Sheets-Sheet 3
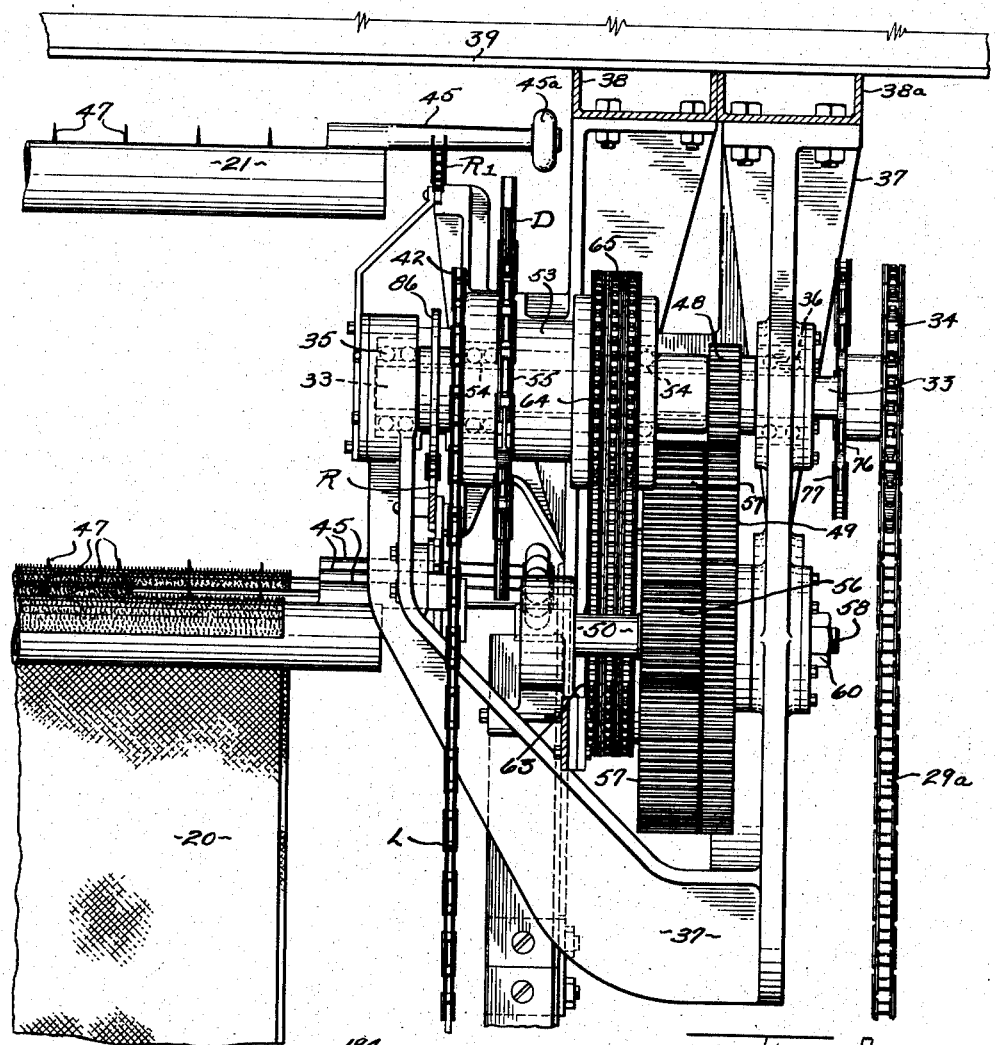
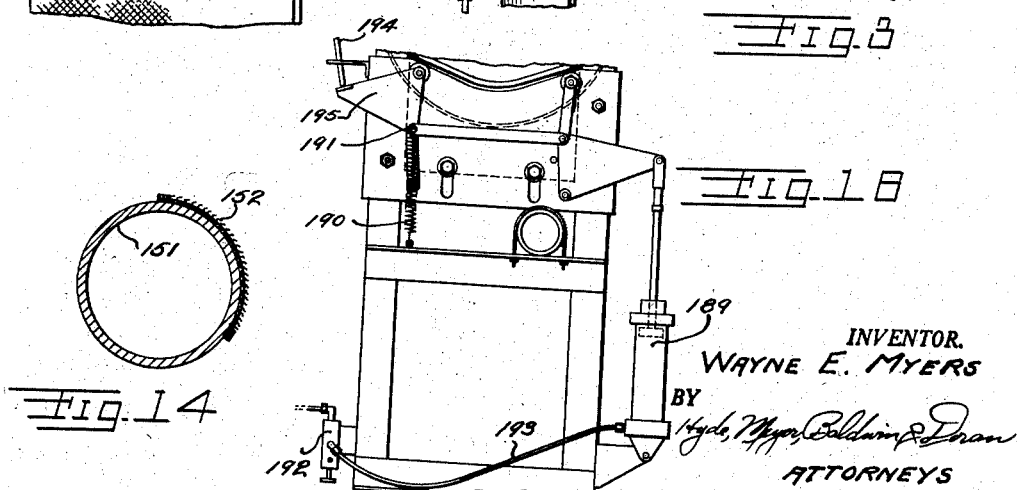
INVENTOR.
WAYNE E. MYERS
BY
ATTORNEYS

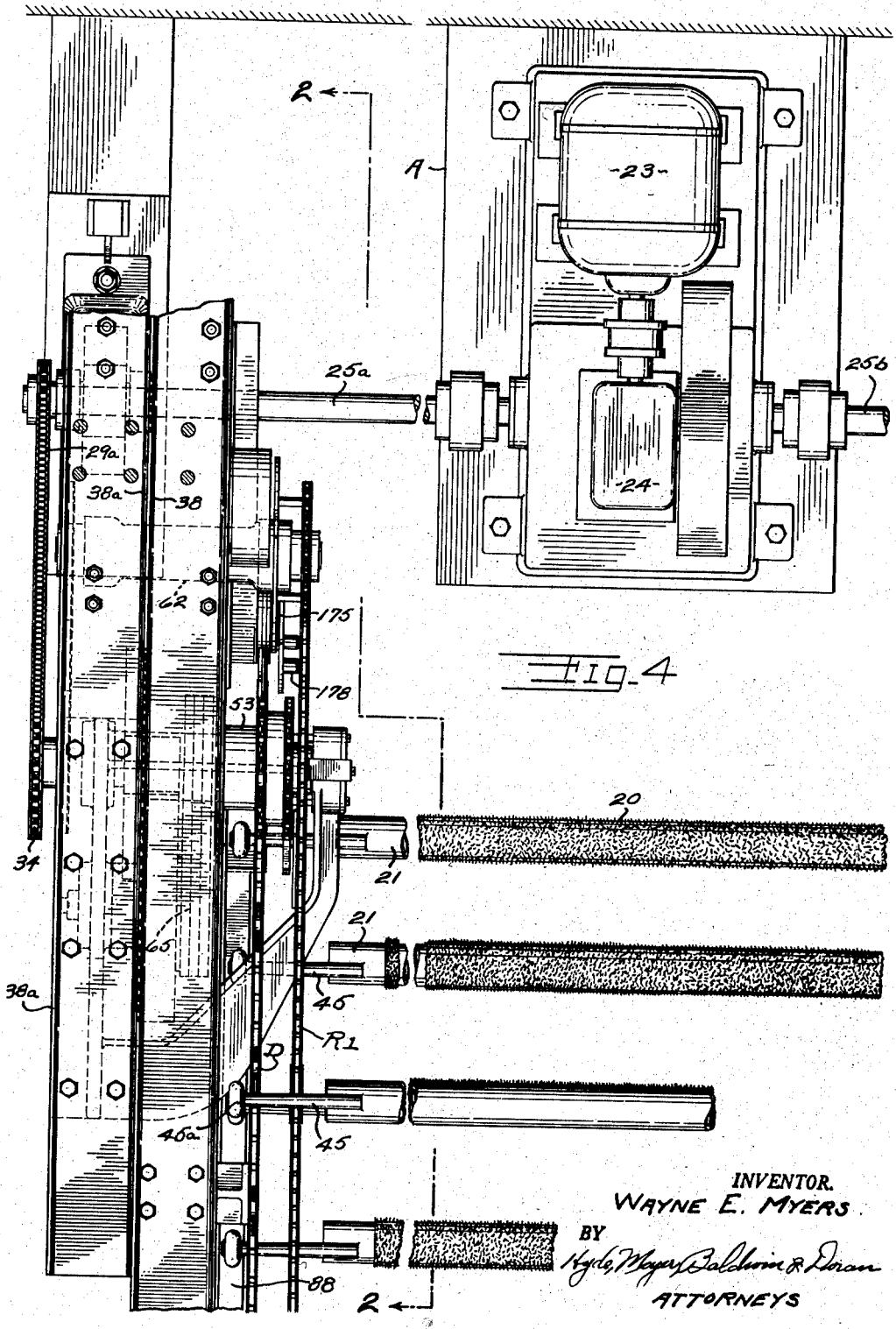

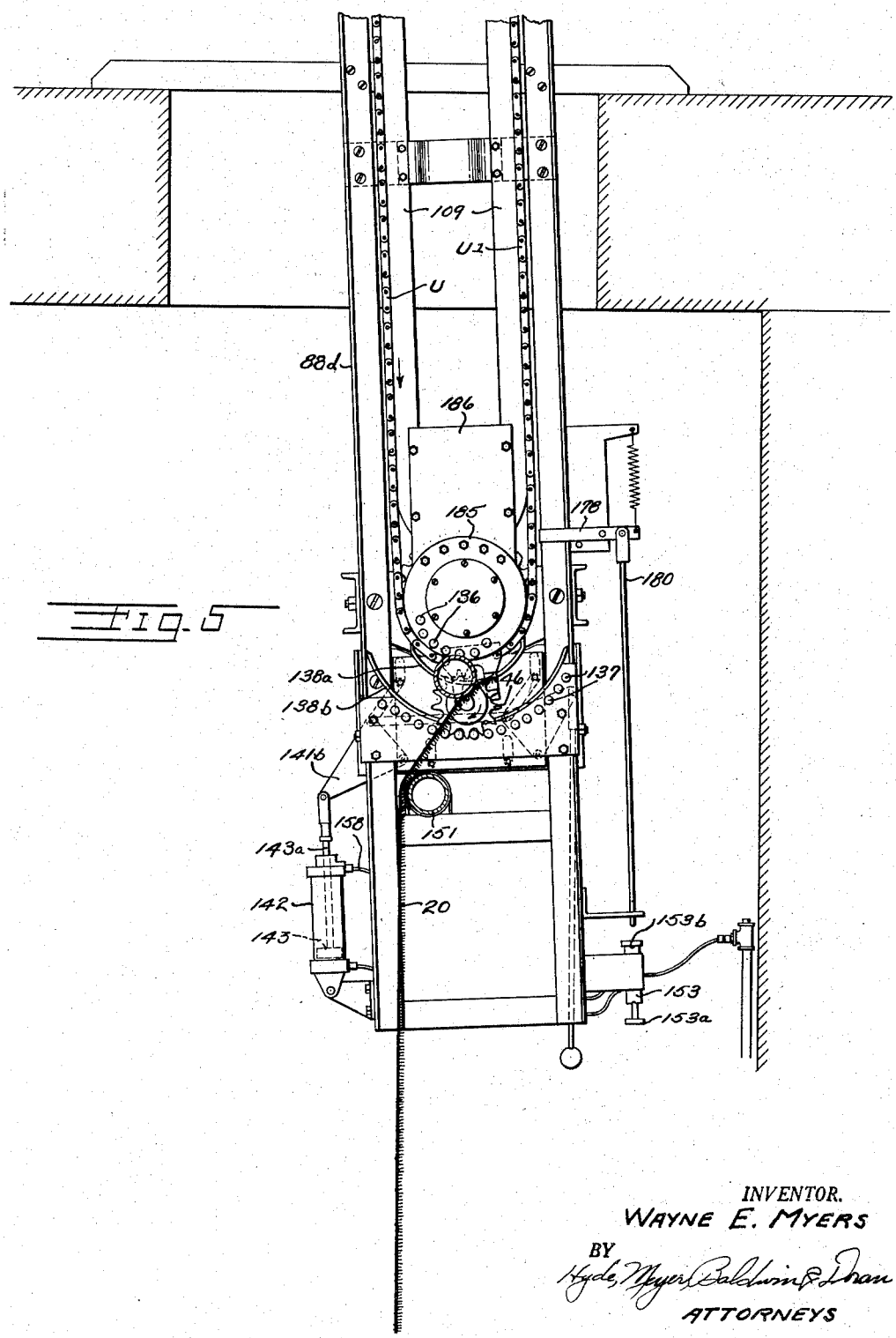

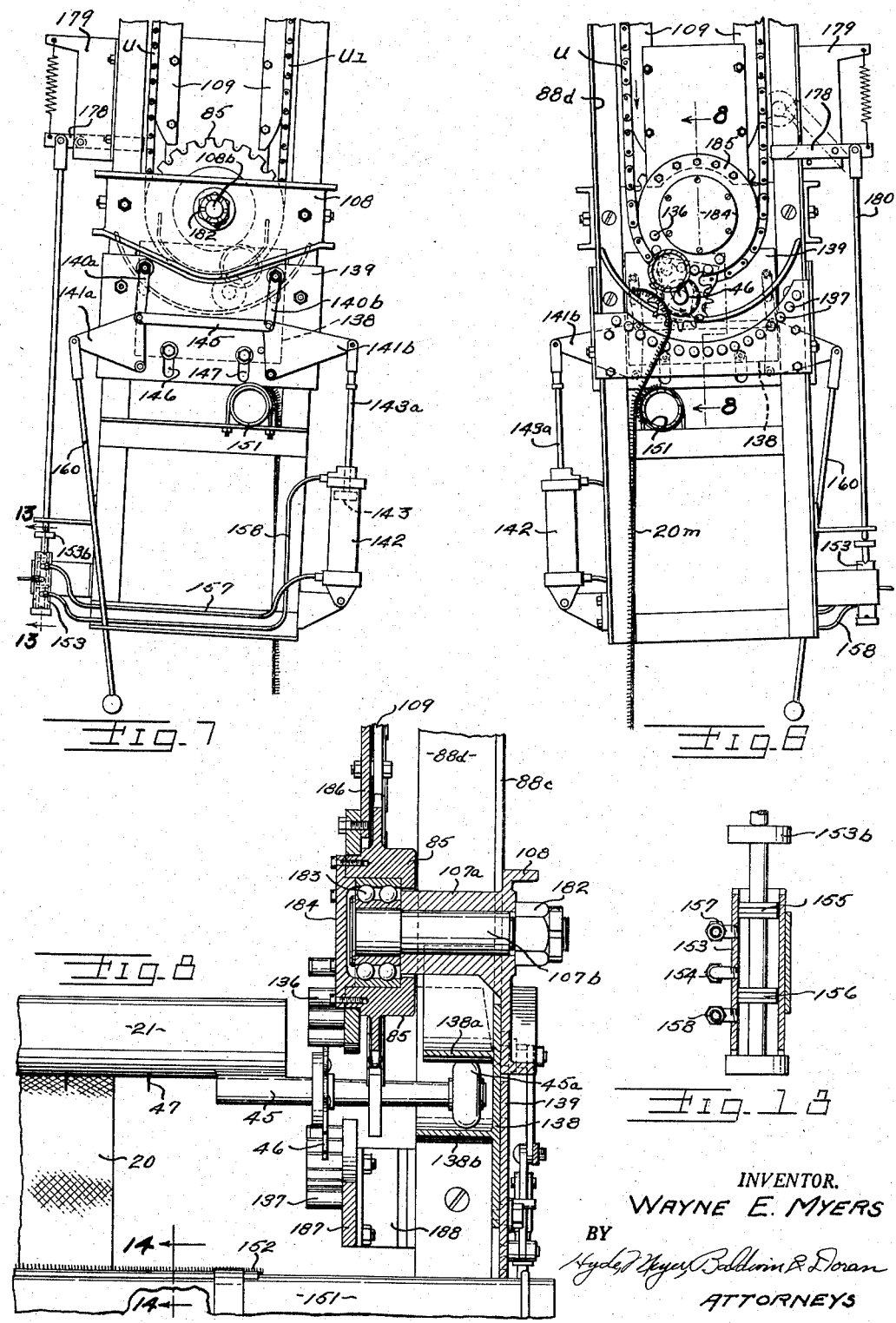

May 19, 1959 W. E. MYERS 2,887,211
RUG CONVEYOR FOR DRY ROOM
Filed May 20, 1955 9 Sheets-Sheet 7

INVENTOR.
WAYNE E. MYERS
BY
Hyde, Meyer, Baldwin & Doran
ATTORNEYS

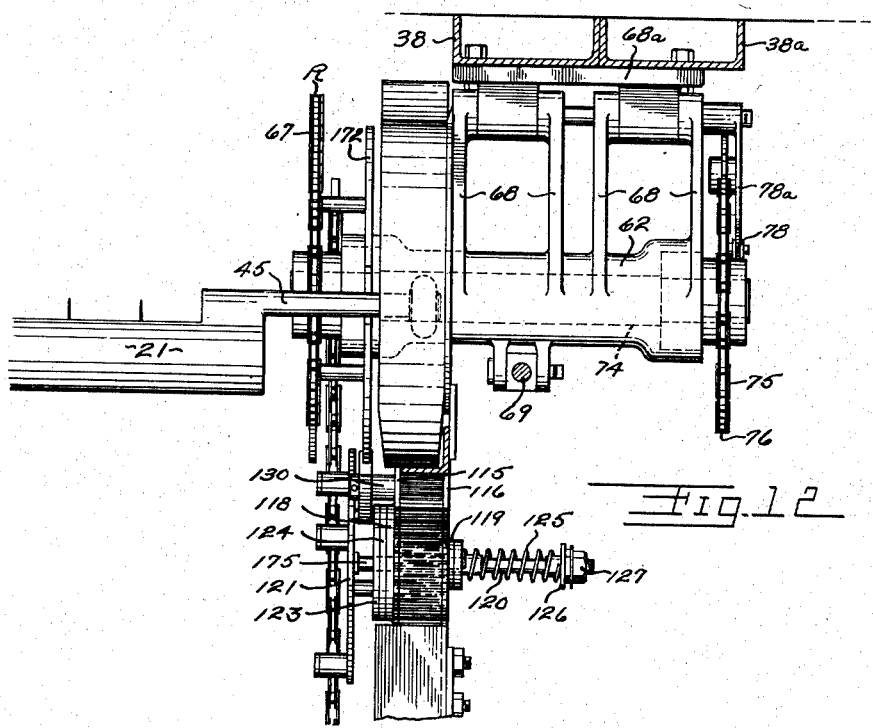
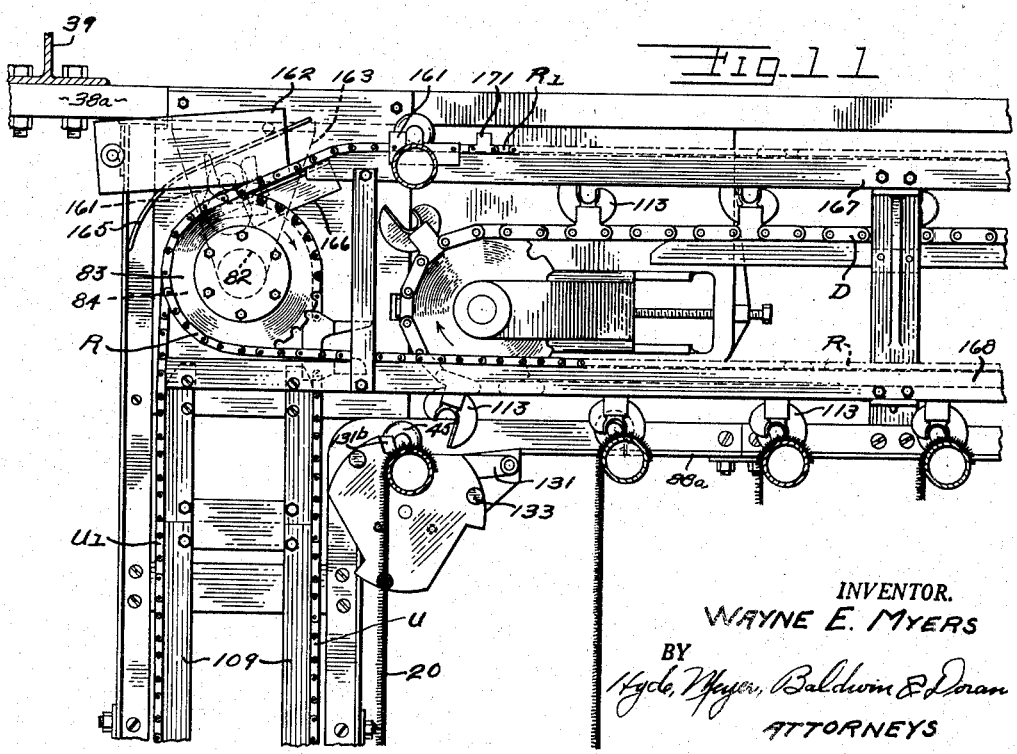

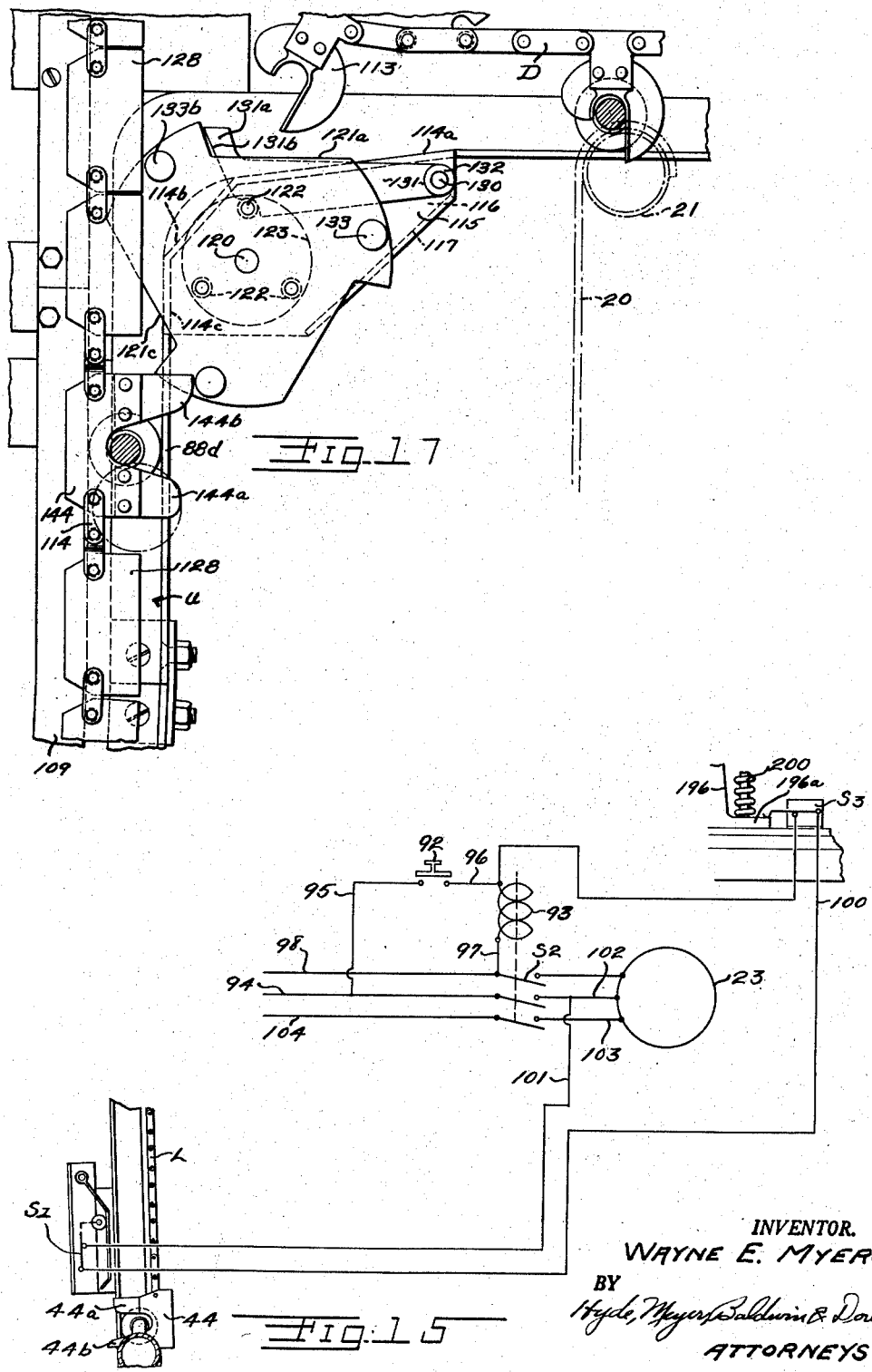

United States Patent Office 2,887,211
Patented May 19, 1959

2,887,211

RUG CONVEYOR FOR DRY ROOM

Wayne E. Myers, Cincinnati, Ohio, assignor to The American Laundry Machinery Company, Cincinnati, Ohio, a corporation of Ohio Application May 20, 1955, Serial No. 509,714

13 Claims. (Cl. 198—25)

The invention relates to rug conveyor means for a rug drying room, usually more conveniently termed a "dry room," wherein wet rugs are individually suspended after washing or other type of liquid cleaning process. The resulting damp rugs are carried on said conveyor means from one end of the room, the loading end, to the opposite end or unloading end. For convenience the conveyor means will also be described as having a loading end and an unloading end.

Those skilled in the art are familiar with the general arrangement wherein a damp rug has one end thereof secured to a pole or similar device, after which the pole is raised on a vertical conveyor at the loading end, transferred to a horizontal conveyor at the top end of the loading conveyor, moved horizontally progressively from the loading towards the unloading end, and then transferred from the horizontal conveyor to a vertical unloading conveyor at the unloading end. At the unloading end the rug is removed from its carrier pole, and the empty pole is transferred to the loading end for re-use.

In the aforementioned prior art devices the return conveyor for empty poles moved slowly, as of course also did the work carrying conveyor, and if there were, for example, fifty loaded poles in motion there were fifty empty poles returning to the loading end.

One of the critical portions of the apparatus in prior use was the transfer means for transferring poles from the vertical to the horizontal conveyor, or vice versa. Various operational problems arose at this point. Other problems arose from the fact that conventional rugs have a substantial transverse dimension, requiring long carrying poles, and therefore the two side-supporting conveyor frames were spaced widely apart.

The usual driving arrangement was to provide one motor to drive the conveyor system on one side, or some part thereof, and to further provide a driving shaft or shafts extending transversely to the other side. This required very careful alignment of bearings at opposite ends of these transverse shafts.

These and other disadvantages of prior art rug conveyors of this character may be inferred from the following listing of objects of the present invention wherein the novel structural features and advantages are emphasized.

One object of the invention is to provide a smoothly working, positive, and safe rug conveyor system for a dry room.

Another object is to provide a rug conveyor which can be prefabricated in suitable unit lengths for subsequent assembly in any desired arrangement.

Another object is to provide a rug conveyor wherein the left and right side conveyor systems have their individual power transmissions, but wherein there is a single driving source for both sides so located that it does not interfere with the free operation of the conveyor moving parts or the moving rugs.

A further object of the invention is to reduce the number of conveyor poles required in the system, by providing for increased speed in the empty role return mechanism, and wherein the said pole return mechanism in turn drives the vertical delivery conveyors at a speed in excess of the speed of the horizontal rug carrying conveyor.

A further object of the invention is to provide a rug drying conveyor system wherein the vertical conveyor at the loading end, the vertical conveyor at the unloading end, and the horizontal overhead empty pole return conveyor all are synchronized and travel at the same rate of speed, which rate is in excess of the rate of speed of the horizontal rug conveyor.

A further object of the invention is to provide rug conveyor means wherein the vertical conveyors at both ends diverge downwardly, that is to say, they each inclined downwardly and outwardly, so that suspended rugs which are being carried upwardly from the loading point to the horizontal conveyor or downwardly from the horizontal conveyor to the delivery point swing clear of contact with the ones immediately below them, and fouling up or other interference is thereby prevented.

Another object of the invention is to provide novel and improved mechanism for the transfer of rug-carrying poles, whether empty or loaded, from one conveyor element to the next conveyor element in the operational sequence.

Another object of the invention is to provide novel and improved means for predetermining, at the choice of the operator, the direction of rotation of a rug carrying pole when such pole is being rotated to free a dried rug therefrom at the delivery end of the apparatus.

Another object of the invention is to provide novel and improved carrier means for retaining rug poles so that they move with the conveyor.

A further object of the invention is to provide novel and improved chain link means for cooperation with the aforesaid transfer mechanism in the operation of transferring a pole from one conveyor element to the next conveyor element.

Another object of the invention is to provide novel and improved safety control means for interrupting driving power in the event of jamming of a conveyor element.

Other objects and advantages will be apparent from a study of the following descriptive text, in conjunction with the accompanying drawings, in which:

Fig. 1 is a side elevational view of practically a complete dry room rug conveyor system including: the loading conveyor which extends into the room beneath the dry room; the horizontal drying conveyor and horizontal empty pole return, both near the dry room ceiling; and the delivery and unloading conveyor, the part of the latter which extends into the lower room being broken away.

Fig. 2 is a fragmentary side elevational view of the inner, upper, corner of the right side frame of the apparatus where the upright conveyor at the loading end meets the horizontal conveyors, the view being taken on the line 2—2 of Fig. 4.

Fig. 3 is a vertical sectional view taken on the section line 3—3 of Fig. 2.

Fig. 4 is a top plan view, taken on the line 4—4 of Fig. 2.

Fig. 5 is a fragmentary side elevational view of the inner, lower end of the left-hand side unloading conveyor which was missing from Fig. 1, the present drawing being considerably enlarged in comparison with Fig. 1.

Fig. 6 is a fragmentary side elevational view of the inner, lower, left-hand side of the unloading conveyor similar to Fig. 5, but with some working parts in a different operating position.

Fig. 7 is a fragmentary side elevational view of the outer, lower, left-hand side of the unloading conveyor, this view and that of Fig. 6 being, of course, the outer and inner side respectively of the same part of the apparatus.

Fig. 9 is a vertical side elevational view of a portion of the apparatus shown in Fig. 2, some moving parts being in a different operating position.

Fig. 11 is a fragmentary side elevational view of the inner, upper, corner of the right side frame of the apparatus, where the horizontal conveyors meet the upright delivery or unloading conveyor.

Fig. 12 is a vertical sectional view taken on the line 12—12 of Fig. 9.

Fig. 13 is a sectional view taken on the line 13—13 of Fig. 7, and enlarged.

Fig. 14 is a sectional view taken on the line 14—14 of Fig. 8, and enlarged.

Fig. 15 is a diagrammatic showing of the electrical control system.

Fig. 16 is a vertical elevational view of another embodiment of track control, somewhat similar to that shown in Fig. 7.

Fig. 17 is a side elevational view similar to a portion of Fig. 11, but enlarged, and showing a specific type of chain link differing somewhat from that shown in the earlier drawings.

General description

Figure 8:
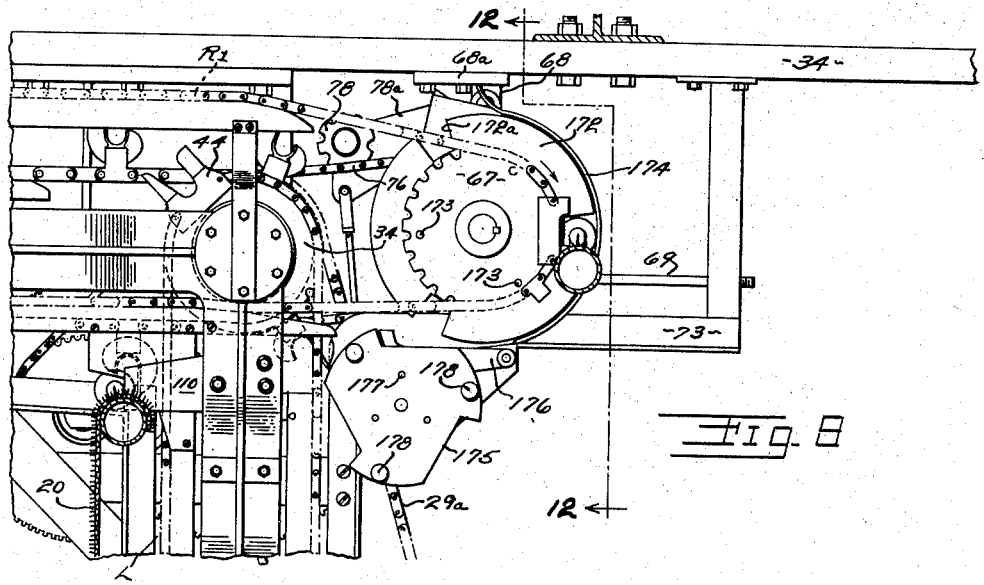
Fig. 8 is a vertical sectional view, somewhat enlarged, as taken on the section line 8—8 of Fig. 6.

Speaking first generally, with reference particularly to Fig. 1, the rug drying means is of rectilinear arched form having two spaced upright structures, a right and a left side frame or arch, and across the top a horizontal structure. For the purpose of this specification only one arch will for the most part be described since the operation in each side is mainly identical. Referring now to Figs. 1, 2 and 11, a wet rug 20 is attached to a pole 21 at the loading end of the apparatus, and thereafter the pole 21, carrying rug 20, is carried upwardly on an endless loading conveyor L and then automatically transferred, in a manner to be later described, to an endless horizontal drying conveyor D, better shown in Figs. 2 and 11. At the delivery end of the room the horizontal drying conveyor D automatically transfers the pole and rug to the endless upright delivery or unloading conveyor U. Other rugs 20a, 20b, 20c, 20d, etc., have preceded rug 20 in this sequence, as well shown in Fig. 1. The conveyor D is called a drying conveyor because it moves relatively slowly across the room, thereby permitting the rugs to dry during transit. It may be noted here that there is a fourth endless conveyor across the top of the arch, generally parallel to but spaced from conveyor D. This fourth conveyor will be identified by letter R to indicate a return conveyor since it carries empty poles rearwardly for use in a new travel cycle. It may be further noted that the inside flights of conveyors L and U (namely the flight towards the center of Fig. 1) are active in the operation so far described. The outside flight $L_1$ receives an empty pole from conveyor R and carries it clockwise (Fig. 1) around to the loading point or starting point at S. The outside flight $U_1$ carries an empty pole upwardly and clockwise (Fig. 1) and delivers it to the upper (outer) flight $R_1$ of fast return conveyor R. As previously intimated, and as will later be more fully described, conveyors L, U and R travel at relatively high speed as compared to the considerably slower speed of drying conveyor D.

Conveyor driving and transmission means, Figs. 1, 2, 3 and 4

Four endless conveyors have so far been characterized. There are, of course, eight, four on the left side and four on the right side looking in the direction of rug travel, and it may happen in this description that in transition from one figure of the drawings to another there may be a transition from the right side set of conveyors to the left side set of conveyors or vice-versa, but this should not prove confusing since identical reference characters will refer to mirror-image parts on both sides.

I have provided a single power unit for driving all endless conveyors on both sides, which sides are normally fifteen to twenty feet apart depending on the pole length used. The power source A of Fig. 1, better shown in Fig. 4, comprises a motor 23 coupled through a conventional speed-change and directional-change unit 24 to transverse shaft parts 25a, 25b, which at their ends are journalled in bearing housings 26a and 26b on wall brackets 28.

Figure 18:
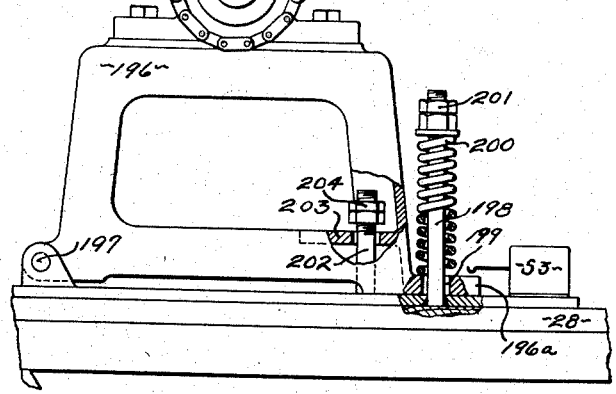
Fig. 18 is a side elevational view of a drive shaft bearing support, to show the location of a motor cut-off switch.

Each side frame has its own transmission, each transmission driven by a respective chain from sprockets on the respective ends of shaft parts 25a, Figs. 1, 2, 3 and 9, and 25b, Fig. 18. One such chain 29a is shown driving the transmission for the right side conveyors. Fig. 18 shows the left side bearing support for shaft part 25b which drives sprocket 30 and chain 29b.

This drive arrangement has a practical, advantageous aspect. In the older systems with fifteen to twenty feet of transverse shafts, and frequently three or more shafts, there was a problem of getting the heavy, unwieldy conveyor structures installed so far apart with sufficient accuracy of alignment. Also the atmospheric conditions in the dry room were conducive to binding or cramping of shaft bearings, due to humidity, thermal expansion, etc. In the present arrangement, with each conveyor side driven independently, painstaking alignment is not required, and it is only necessary to have the sides parallel and sufficiently aligned to avoid cocking the poles.

The transmission shown in Figs. 2, 3 and 4 is basically responsive to rotation of a main shaft 33 which is driven by chain 29a through a sprocket 34, Fig. 3. The shaft 33 is journalled in bearings 35, 36 in a transmission support bracket 37, the latter being secured to and suspended from a channel member 38a which in turn is fixed to a transverse beam 39 in or near the ceiling.

A sprocket 42 (Fig. 3) on shaft 33 drives the loading conveyor L. This endless conveyor, of link chain form, runs around an idler sprocket 43 (Fig. 1) at the bottom of the conveyor frame. Equidistantly spaced on the chain are pole carriers 44 (Fig. 2), these carriers being bifurcated to provide spaced fingers 44a and 44b. The slot between fingers is adapted to receive an offset, reduced axle portion 45 of rug pole 21, this feature being well shown, for example, in Figs. 3 and 8. Poles 21 may be constructed from any desired material such as wood, or the tubular metallic stock here shown. Although not here shown, the metal tube might have a wooden core. By reason of the pole axle 45 being substantially off-center with respect to the axis of the pole itself, the pole is underslung and has no tendency to rotate, but it can be intentionally rotated at a certain point in the operational cycle by means of a sprocket 46 attached to the axle, as will appear.

The upper surface of the pole carries a strip of pins 47 (Fig. 3) upon which the rug is impaled. A rug is normally looped only a short way around a pole, nap upward, and even though the weight may cause the pole to cant somewhat, the pins hold it securely.

Speed Reduction drive for drying conveyor

The speed reduction gearing between the main shaft 33 and the drying conveyor chain D is arranged as follows. A pinion 48 affixed to shaft 33 drives a large gear 49 on an idler shaft 50 journalled below shaft 33 in the transmission bracket 37. Rotatably mounted on shaft 33 is a shorter sleeve 53 running on bearings 54. This sleeve has a sprocket 55 which drives chain conveyor D. Integral with gear 49 is a pinion 56. This drives another large gear 57 journalled on a stub shaft 58 forward of shaft 50 in the supporting bracket 37. The end of shaft 58 is threaded and shouldered and fits through a slot 59 in the supporting bracket, secured by a nut 60. Slot 59 is arcuate, concentric with shaft 50. Rotatable with gear 57 is a multiple sprocket 63, and this drives a multiple sprocket 64 on sleeve 53 by means of chain 65. Rotation of sleeve 53, of course, rotates sprocket 55 previously mentioned which in turn drives chain D at a rate considerably reduced from the rate of rotation of shaft 33. The multiple sprocket 63 is interchangeable, fitted on a keyed hub fixed with respect to gear 57. This sprocket for additional convenience can be diametrically split, being bolted to tightly clamped position on the hub, and suitably sized sprockets can be substituted for any desired speed ratio.

*The horizontal fast return conveyor drive*

As previously stated, the horizontal pole return conveyor "R" is driven at the same rate as the vertical conveyors. Its drive sprocket 67 (Figs. 2 and 12) is journalled in a supporting bracket 68 spaced somewhat from the main transmission. The bracket is pivotally suspended from a part 68a bolted to channels 38, 38a, and has a link rod 69 connected to a brace member 70 as a chain take-up means. The sprocket support 68 may be located farther back from the transfer point in some installations since the chain length is in multiples of the space between carriers. In those cases the auxiliary track sections 73 (Fig. 9) would be made the desired length, and the poles would come around onto the track and be moved forward to the transfer device by the carrier lug.

Sprocket 67 is fastened at one end to a shaft 74 journalled in a tubular bearing housing 62 of bracket 68. At the other end of the shaft 74 is secured another sprocket 75 which is driven by a chain 76 from a drive sprocket 77 on the main transmission shaft 33. There is, therefore, a direct drive from shaft 33 to the fast return conveyor R.

A small idler take-up sprocket 78 rides on chain 76 (Fig. 2), its supporting arm 78a pivotally carried by a shaft 79 on the bracket 68. This maintains chain 76 in sufficiently taut condition.

*Fast drive for unloading conveyor*

As previously indicated, the unloading conveyor U travels at a relatively fast speed which is also the speed of travel of the loading conveyor L and the empty pole return conveyor R.

Unloading conveyor U consists of an endless chain extending substantially vertically, although actually somewhat divergent outwardly and downwardly at the delivery or unloading end of the machine. A shaft 82 is carried in the frame at the delivery end of the machine (Fig. 11). Fixed to shaft 82 are two identical sprockets 83 and 84. As indicated by the full and dotted lead lines in Fig. 11, sprocket 84 is behind sprocket 83. Pole return conveyor chain R drives sprocket 83, and sprocket 84, turning therewith, drives the unloading conveyor chain U at the same speed. At the lower end of the chain is an idler sprocket 85 (Fig. 7). At the loading end, conveyor chain R runs under a guide disk 86 (Fig. 3).

*Structure and operation: loading end*

Returning now to the loading end, an empty pole moves downward on the outer flight of conveyor L, being carried in the slot between fingers 44a and 44b of carrier 44, best shown in Fig. 2, although in Fig. 2 it happens to be on the ascending flight of conveyor L. Referring to Fig. 1, and assuming that the carrier is moving downwardly at about the point B, it continues and rolls around an arcuate track 87 at the bottom. The track sections are formed from simple angle irons 88 (Fig. 2). A carrier leg abuts the pole axle 45 (Fig. 8) which normally maintains the wheel 45a in contact with the leg of the track 88. At the bottom the straight portion of the angle iron tracks rest on a foot piece 89 on the floor, but the arcuate track section intercepts the pole wheel and directs the pole around and upwardly on the inner track. It may be noted that the upright loading and unloading conveyors and their accessory support and frame structures carry only their own weight, and rest on the floor, and the frame structure for the horizontal conveyors is suspended from the ceiling, as previously explained. Upward movement of the pole on the inner flight of conveyor chain L intercepts the switch $S_1$ and cuts off current in a maintaining circuit which had previously been established as follows (Fig. 15): The operator depressed button 92 to energize solenoid 93 as follows: line conductor 94, conductor 95, button switch 92, conductor 96, solenoid coil 93, conductor 97, and line conductor 98. Energization of the solenoid causes its armature to close motor switch $S_2$, starting motor 23 and also setting up a maintaining circuit for the motor as follows: from line conductor 98, conductor 97, coil 93, conductor 99, closed switch $S_3$, conductor 100, closed switch $S_1$, conductors 101 and center contact of switch $S_2$ and line conductor 94. Starting button 92 may now be released, since the circuit is maintained as above indicated, but the maintaining of the circuit is dependent on the closed condition of switches $S_1$ and $S_3$. As has been noted, $S_1$ is opened by arrival thereat of each empty pole, which necessitates re-starting by means of button 92. Switch $S_3$ is opened only in certain emergency or undesirable conditions as will be explained hereinafter but the apparatus may well be used indefinitely without opening switch $S_3$.

The frame track members 88 are connected near the bottom by a sprocket support bracket 107 (Fig. 1) and at intervals along the height by cross members 108 which have a portion 108a extending inwardly between the tracks to provide a support for chain guiding strips or bars 109 which are located a short distance inward from the plane of the roller tracks 88. Chain guides 109 (Figs. 6, 7 and 8) are thin bars, fixed in place as above noted, and their edges serve as backing supports for the conveyor chain rollers. The pole carriers 44 have rearwardly extending guides or plates 44c (Fig. 2) which straddle the edge of the guide strip 109 to additionally hold the conveyor chain in its correct path. This track structure may be fabricated on the job, but it has been found advantageous to have units of standard length made up so that they can be readily assembled. A unit would contain, for example, a few feet of parallel tracks, chain guides, and cross connectors. The meeting plane of two such units may be noted, for example at the planes M in Fig. 2. The frames for the other conveyors D, U, and R are similarly constructed from readily assembled units.

*Pole transfer from one conveyor to another*

There are two "transfer" points for a loaded pole in the present apparatus, namely the place where a pole with a wet rug thereon is transferred from the upright loading conveyor L to the horizontal drying conveyor D, and the place where the pole with a dried rug thereon is transferred from the drying conveyor D to the unloading conveyor U.

When the operator places a wet rug on a pole at the loading end of the dry room, and pressed the starting button, the pole ascends on the inner flight of conveyor L as shown for rug 20 in Fig. 2. The pole axle portion eventually contacts and raises a latch member 110 pivoted at 111 on the transmission bracket. As the pole roller reaches the level of the track corner where upright track 88 meets its horizontal counterpart 88a, its carrier 44 continues upwardly to make the turn and descend again, but since carrier finger 44b slopes downwardly the roller tends to fall outwardly towards the left (Fig. 2) onto the horizontal track 88a. An additional means is provided to assure correct transfer, namely cam plate 112 which, of course, prevents the pole from ascending further with conveyor L, but instead urges it onto track 88a. As can best be seen in Fig. 2, the first part of track 88a which receives the loaded pole is inclined slightly towards the upright conveyor, and the pole axle rests against latch 110 until it is contacted by a pusher lug 113 on the lower flight of drying conveyor D. There are a number of such pusher lugs, spaced suitably to intercept a pole quickly after it arrives at the transfer point. The long leg of the lug contacts the pole axle and the pole wheel moves along the horizontal track. As the wheel moves up the track incline, the axle part moves up between the front and back faces of the lug. Since for drying purposes the horizontal drying conveyor D moves more slowly than the upright loading conveyor L, the pole-moving lugs on conveyor D are closer to each other than are the carriers 44 on conveyor L, and so spaced that there will always be a lug arriving at the transfer point immediately after a pole is deposited on track 88a by the loading conveyor.

Figure 10:
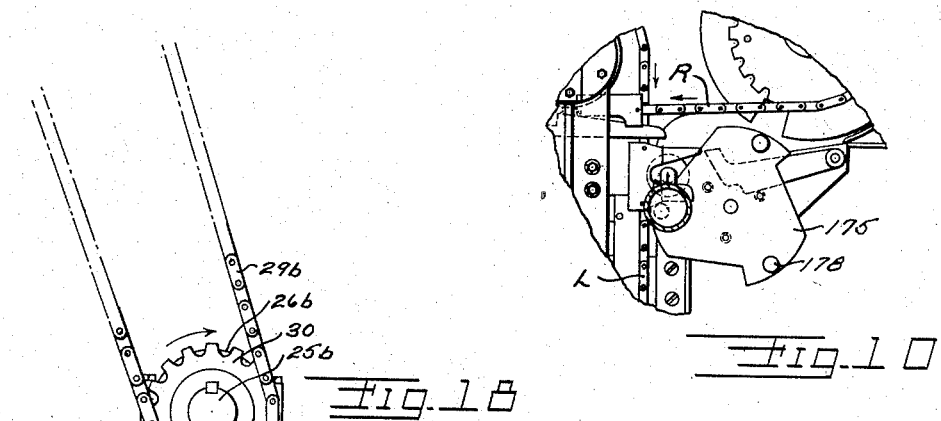
Fig. 10 is a view of a part of the apparatus shown in Fig. 9, the operating parts being in yet another operating position.

The drying conveyor moves the rug-carrying pole slowly across the dry room, the temperature and atmospheric conditions in the room being adequate to fully dry the rug in the time elapsing before arrival at the unloading conveyor, the location of the next transfer point, which is well shown in Figs. 10, 11, 12, and the modified version 17. As will later appear, Fig. 17 differs from the embodiment so far described only in the construction of the links 128 of unloading conveyor U. The showing of Figs. 11 and 17 represents the upper, inner corner of the conveyor frame structure at the delivery end, on the right as viewed from the loading end.

When a pole arrives at the end of the horizontal conveyor, it is automatically freed from lug 113 and comes to rest at the transfer mechanism. Automatic clearance from lug 113 is facilitated by a special corner section comprising a downwardly inclined initial stretch 114a, a corner stretch 114b, and a final stretch 114c aligned with the upright track 88d, all as best seen in Fig. 17. These parts are welded between a front plate 115 and a rear plate 116, and there is also a spacer plate 117 to maintain the front and rear plates in spaced relationship. On the respective outer surfaces of plates 115 and 116 are secured boss discs 118 and 119 and those are bored to receive a shaft 120. Secured to the inner end of shaft 120 is a transfer disk 121 and fixed on disk 121 are three evenly separated spacer pins 122 which are secured to a contact disk 123 and this in turn is spaced from boss disk 118 by a friction disk 124. Examination of Fig. 12 will show that the assembly of disks 118, 121, 123, 124 are maintained in operative contact by the compression spring 125 which is retained on shaft 120 by the washer 126 and nut 127.

The side plate 115 has a stud 130 projecting therefrom which serves as a pivot pin for a latch member 131 spaced slightly from plate 115 by a shoulder on the stud and retained by a collar 132. The other end of latch 131 is shaped at the bottom to rest on an aligned spacer 122 as best shown in Fig. 17. The latch rests in the manner shown when the transfer disk 121 is at rest, but it will be apparent that counterclockwise movement of the transfer disk 121 will cause the spacer pin 122 to clear the end face 131b of latch 131, at which time the latch will drop until its lower edge contacts the next spacer pin in counterclockwise sequence. As will appear, the upturned toe 131a of the latch, when in the position shown in Fig. 11 retains a pole axle 45 until the latch is dropped by rotation of disk 121 with its accompanying spacer pins. The spacer disk 121 has three indented track parts 121a, 121b, 121c (Fig. 17) to receive, control, and direct a pole axle. Retrograde movement of spacer disk 121, that is clockwise in Fig. 17, is prevented by engagement of a spacer pin 122 with the heel of latch 131. Transfer disk 121 carries three spaced rollers 133 which, as will appear, are successively engaged by pole carriers 144 on the unloading conveyor, which are identical with the carriers 44 on the loading conveyor. This engagement rotates transfer disk 121 through about 120°, as permitted by its friction clutch disk 124.

As the pole roller moves down inclined section 114a the axle comes to a stop against latch part 131a. In this position lug 113 clears the axle and the pole rests momentarily. The spacing of carriers 144 is such that a carrier soon arrives to registry with the transfer disk. The lower finger 144a of a carrier 144 contacts a roller 133 on the transfer disk and rotates the disk. As soon as spacer pin 122 clears the bottom corner of front face 131b the latch begins to drop, and when toe 131a clears the pole axle, the pole rolls forward a short distance into engagement with the face 121a (Fig. 17) and then, as disk 121 turns counterclockwise, into the corner where face 121a meets the shorter radial face of the cut-out. When this shorter face begins to be inclined below horizontal position, the pole moves only a short distance to reach the slot between fingers 144a and 144b of carrier 144. While this is going on the latch 131 has dropped to rest in its lowest position on top of the next successive spacer pin 122. The just-described position is well shown in Fig. 10. The longer finger 144b of the carrier 144 next contacts roller 133 and moves it to the indexed position shown in Fig. 17 wherein the transfer disk is in position to receive the next pole from the drying conveyor, and the last pole transferred is proceeding downwardly on the unloading conveyor U. From this description it will be apparent that the motive force for rotating the transfer disk is derived frictionally from rotation of the unloading conveyor itself.

*Operation and structure of the unloading conveyor*

In this description of the novel features and operation of the unloading conveyor, reference may be had to Figs. 5, 6, 7 and 8 which show the lower end of the unloading conveyor, left side as viewed from the loading end. Figs. 5 and 6 are views from within the apparatus, that is to say between the right and left frame structures. Fig. 7 is a view from outside. Fig. 8, of course, is a vertical sectional view.

The loaded pole, with a dry rug thereon, is carried downwardly, its roller riding against the leg 88d of the angle track. This leg may be wider, to add strength to the vertical structure. The pole release mechanism can be disposed either at the bottom of the left-hand conveyor, as here shown, or it can be on the right conveyor. The release mechanism is responsive to operation of a sprocket 46 fixed on pole axle 45. There are two spaced arcuately arranged sets of pins 136 and 137 respectively above and below the arcuate path of travel of the pole at the lower end of conveyor U. Depending on the choice of the operator, the sprocket can be caused to contact either pins 136 or 137, and since the pins are spaced to cooperate with the sprocket teeth, the pole may be caused to rotate in either one of the two possible directions depending on which set of pins the sprocket contacts.

A shiftable arcuate track portion in which the pole wheel 45a rolls, as best seen in Fig. 8, provides the means whereby the axle and sprocket 46 may be moved either upwardly or downwardly to respectively contact either pins 136 or 137. This shiftable track portion has upper segment 138a and lower segment 138b between which wheel 45a controllably moves. The backing plate 138 of the shiftable track portion fits with clearance between the track frames 88d and slides in contact with a support plate 139 (Fig. 7) secured to the tracks. Plate 138 is movable by means of a pair of spaced toggles having upper links 140a, 140b, and lower links 141a, 141b operatable by a fluid power motor 142 by means of a piston 143 and its rod 143a. The lower links 141a, 141b are, in effect, bell cranks, although of triangular plate form and they are cross-connected to work in unison by means of a link 145. The links 140a, 140b are pivotally connected to studs on movable plate 138, and the links 141a, 141b are pivotally connected to studs on fixed plate 139. The movable plate is provided with suitable studs which slidably fit in slots 146 and 147 in the fixed plates, for guiding purposes, and the studs at the upper end of links 140a and 140b also extend through guide slots in the fixed plate. In Fig. 7 the toggles are shown fully extended, so that plate 138 is in its uppermost position, and sprocket 46 can rotate in contact with upper pins 136. In Fig. 5 the toggles are "broken" and the sprocket 46 can rotate in contact with the lower pins 137. This latter is the normal operating position, as will appear in the following paragraph.

Referring briefly to Fig. 1, the rug scrubbing is done on the lower floor 150, within the confines of the conveyors, and in loading at the right side of the figure the rear side of the rug is looped crosswise over an ascending pole. Accordingly, to release the rug the pole must be rotated in the opposite direction, counterclockwise in Fig. 1 or clockwise in the Fig. 5 view, which means that the pole sprocket must roll around the lower set of pins. In certain installations the rugs are placed on the poles from the other side, and the rug backs will be looped in the opposite direction, so they will have to be rotated reversely in releasing. To accomplish this in normal procedure the air supply lines can be reversed to motor 142, the operation of which will later appear. The shiftable track device, therefore, imparts flexibility, so that it can be adapted very readily to meet the situation in a given plant. The shifting device however has a more immediate purpose, as will appear.

The automatic operation of the stripping device proceeds as follows. As the loaded pole wheel 45a rolls in between the segments 138a and 138b, sprocket 46 engages rack pins 137 (Fig. 5) and the pole begins to rotate clockwise. It will be recalled that a pole does not normally rotate since it hangs below an off-center axle. There is an auxiliary stripping device which extends transversely between the right and left conveyor frames which makes contact with the leading face of the rug, normally the nap side. This device consists of a pole or pipe 151 (Figs. 5 and 8) having a carding cloth 152 wrapped at least partially around it (Fig. 14). As is known to those skilled in the art, carding cloth consists of closely spaced wire points or pins held in a fabric backing, and the points usually extend at a common angle to the backing so that material drawn across them in one direction adheres, but is readily freed by movement in the other direction. In the present instance the angularity is downward, so that the initial downward movement of the rug against the stripper is permitted to proceed freely, but as the pole axle sprocket engages the track pins, the rug pole begins to cross underneath the conveyor. This causes a reversal of rug movement on the carding cloth, and the rug is held, facilitating its removal from the pole 21. When it is completely freed from this pole it drops by gravity from the carding cloth stripper. An inspection and/or wrapping table may be disposed beneath the stripper.

Track shifter in operation

Figs. 6 and 7 show (from the inside and outside respectively) the arcuate shiftable track in its "up" position, producing counterclockwise rotation of the rug pole, as above described. In Fig. 6 a rug 20m is shown dropping free. Occasionally an extra long rug, runner or the like must be dried, and this is done by looping each end over a separate pole, one such example 20x being shown in Fig. 1. When loading such article, the front end is looped over a pole in normal direction and the conveyor is started. The rear end is looped reversely (counterclockwise in Fig. 1) over the next pole, the nap lying outwardly to facilitate drying.

When the first pole reaches the transfer point and starts down, the hanging loop temporarily decreases, but the second pole will reach the unloading conveyor before the first pole reaches the unloading point so that a short loop is maintained, depending on rug length. With the shifting track in normal position the first pole rotates to free the leading end of the rug. As the pole with the trailing end thereon reaches the unloading point, the operator reverses the shiftable track position, in manner to appear below, and the second pole is rotated in the opposite direction, freeing the trailing end of the rug which, it will be remembered, was looped in the opposite direction.

Referring to Figs. 5, 6, 7 and 13, to shift the arcuate unloading track the operator pushes the control plunger end 153a of a slide valve 153 to change it from the normal working position (Fig. 5) to the occasional or abnormal working position (Figs. 6 and 13). Air is at all times supplied to valve 153 through pipe 154 which is between packing heads 155 and 156 on the plunger. A glance at Fig. 13 indicates that reversal of the plunger position has cut off air to one outlet, for example to pipe 158 as shown, and supplies it to pipe 157. Looking now at Fig. 7, in which the track 138 is at the moment in "abnormal" position, supply of air from pipe 157 to the lower end of motor 142 has moved the piston 143 upwardly straightening the toggle linkage and reversing the track position. Air from the inactive side of motor 142 exhausts rearwardly through pipe 158 and out the exhaust ports at the end of slide valve 153. Rod 160 is a manual control rod for the toggle linkage.

Empty pole return to loading end

After completing the unloading traverse between the shiftable track segments 138a, 138b the empty pole is carried up the outside flight of $U_1$ (Fig. 11) of the unloading conveyor by its carrier 144. It will be recalled that the unloading conveyor U and the empty pole return conveyor R both travel at fast speed and at the transfer point, shown in Fig. 11, they run around a pair of identical sprockets 83 and 84 on shaft 82. These sprockets are close together. The horizontal conveyor is provided with spaced carriers (really pushers) 161 each of which is arranged to pass the transfer point at the same time that an ascending carrier 144 arrives with an empty pole. This coincidence is shown in dotted line in the upper left corner of Fig. 11. Carrier 144, as it rounds its sprocket 84, pushes its empty pole past the lower right corner of a pivoted latch plate 162 which rises to permit passage of the pole axle, and drops behind it, preventing rearward fall of the pole as its carrier releases it. The long finger of carrier 144 gives the axle a camming push as it releases it and the upwardly extending lug of carrier 161 takes over the movement of the pole along the top of conveyor flight $R_1$.

The angle bracket 163 which supports the shafts of sprockets 83 and 84 fits through a hole in a plate 164. The latter carries a section of guide track 165 which parallels the chain of conveyor $R_1$ at this point. A short piece of angle 166 underlies this chain and cooperates with track 165 to guide and support the pole end when its axle moves out from under the rear inclined finger of carrier 144.

The upper flight $R_1$ of the pole return conveyor rides on a guide or track bar 167 and the lower run R rests on a similar bar 168. These guide bars are supported at their ends as shown in Fig. 11. The vertical guides 109 and the horizontal guides 167 and 168 are united by suitable spacers.

Empty pole transfer to loading conveyor

In this connection reference may be had to Figs. 2, 9, 10 and 12. Arriving back at the loading end the carrier 161, pushing an empty pole, starts down the inclined section towards sprocket 67. A circular plate 172, with notches 172a, rotates with sprocket 67 being supported from the sprocket by studs 173. Plate 172 has a central clearance hole for the end of tubular bearing housing 62 for shaft 74 (Fig. 12). This notched plate 172 functions as a pole carrier for the transfer, and one of its duties is to prevent the pole from rolling unrestrained around the corner. In the construction shown, the stop link 171 restrains the pole in its travel down the incline, and a notch 172a arrives in synchronism with the delivery of a pole by the stop link. The pole roller travels around the curved guide 174. This guide has a back plate 174a fastened to sprocket bracket 68. As is well shown in Figs. 2 and 9 the entrance to curved track 174 is flared to assure reception of the pole roller in the track in event the pole roller is not arriving in correct position, for any reason.

The pole rounds the curved track and comes to registry with a cut-out portion of a transfer disk 175 which is quite similar to the transfer disk 121 previously described, and shown in Fig. 17. The disk 175 travels in synchronism with disk 172, and there will always be a cut out in disk 175 to receive a pole. It has a latch 176, spacer pins 177 to support the latch, and rollers 178 to be intercepted by respective carriers 44 on the loading conveyor. This interception rotates transfer disk 175 to release latch lever 176 and deliver a pole to conveyor flight L₁ (Fig. 1) whereby it is carried downwardly and around to the loading point, thereby completing a travel cycle.

Automatic track return to normal position

Reference can now be had to Figs. 5, 6 and 7. As the empty pole leaves shiftable track section 138 after said section was temporarily shifted to "abnormal" position, the pole axle contacts and operates a lever 178 pivotally mounted on a bracket 179 on the track. A rod 180 pivoted on the other end of lever 178 is thereby pushed downward, moving the plunger of slide valve 153 downwardly to its normal position, thereby admitting air to pipe 158 so as to energize motor cylinder 142, move link 143a downwardly, and set the arcuate track 138 in normal operating position.

Referring more specifically to Fig. 8, as well as to Figs. 6 and 7, the cross bracket 108 secured to the vertical track members 88c has an inwardly extending cylindrical portion 107a bored to mount a stub shaft 107b. The latter is secured by a castellated nut 182 and has a headed bearing portion mounting a ball bearing 183. Sprocket 85 has a hub portion bored to fit on the ball bearing, and is held in place by a cover plate 184, the construction described in this paragraph being similar to that of the lower end of the loading conveyor.

A washer 185 fits in a rabbetted groove on the front of the sprocket 85. This washer carries the upper rack of pins 136, and it is fastened by screws to a plate 186 which in turn is secured to chain guide bar 109. Plate 186 is spaced by shims from the guide bar on each side to leave clearance for sprocket 85. The lower rack of pins 137 is carried by a plate 187 fastened to side pieces 188 secured to the track frame.

Another embodiment of track shift control

In this connection attention is directed to Fig. 16. In this embodiment a single acting air motor 189 is used as a power source, in conjunction with a spring 190 which serves as an over-center bias when connected to the "break" point 191 of the toggle linkage. A conventional on-off air valve 192 supplies air to pipe 193 for motor 189. The link rod 194 is similar to link rod 180 in Fig. 6, but is connected to link 195, the operating link, which in this embodiment is the upper link. Operation of the device is as follows. To shift the track by straightening the toggle linkage air is admitted to fluid motor 189 by valve 192. When the pole leaves the arcuate track and begins its ascent it trips a lever as before, thereby exerting a downward push on rod 194 so as to swing link 195 counterclockwise and break the toggle, whereupon spring 190 collapses the toggle linkage to normal position and pushes the piston of motor 189 downwardly to normal operating position. Air exhausts from motor 189 through the exhaust port of the valve.

Chain interlock with transfer disk

Fig. 17 illustrates a modification in the link chain of unloading conveyor U which provides an interlock to prevent accidental counterclockwise rotation of transfer disk 121 out of registered position. This modification can also be used for the loading conveyor. In the embodiment previously described only the friction clutch plates 118, 123, 124 prevented such accidental counterclockwise rotation, and occasionally a very heavy rug might cause the carrier 144 to cock or twist far enough so that the longer carrier finger 144b would push roller 133 further than intended so as to rotate disk 121 beyond normal registered position. The extra wide chain parts 128 maintain a sufficiently close clearance from rollers 133 so as to prevent disk rotation when such rotation is not desired. When the next carrier 144 arrives it of course rotates disk 121 the required amount. At this time the disk rollers register with the extra long links 114 so that the rollers can fit in the space between a chain part 128 and the leading finger 144a of carrier 144. It is true that the extra long links 114 could be dispensed with by cutting out portions of the chain parts 128 where they register with disk rollers 133. The chain rollers ride against the side guide bars 109 to prevent lateral displacement of the chain.

Safety mounting of conveyor drive support

Fig. 18 shows a feature which has particular utility in the type of conveyor here used. The end bearing support 196 for shaft 25b is pivotally connected at 197 to the base plate. At the rear end a stud 198 secured in the base plate fits through a clearance hole 199 in a lug or flange on the bearing support. On the stud 198 is a heavy compression spring 200 held by nuts 201. Another stud 202, also passing with clearance through a bearing support portion 203 and secured in the base has a nut assembly 204 which serves as a positive limit stop after a certain amount of compression of spring 200.

Spring 200 holds the bearing support down firmly enough during normal running conditions, but if for any reason the conveyor assembly driven by chain 29b jams, the continued rotation of sprocket 30 causes it to begin to climb up chain 29b, thereby raising the rear end of support 196 against the bias of spring 200. The foot 196a operates a switch S₃ which breaks the maintaining circuit for motor 23 as previously described in connection with the wiring diagram, Fig. 15, thereby stopping the motor.

Shaft 25a which drives the other side of the conveyor system has an identical safety feature at its outer end.

To give some idea of the dimensions and other physical characteristics of a typical installation, the layout which formed the basis for the figures in the present application is situated in a dry room 44 feet long, and 16 feet, 7 inches in height to the I-beams. The loading conveyor has a length of 25 feet, 5 inches, center to center and has four pole carriers. The unloading conveyor is 18 feet, 9 inches long, center to center and has three pole carriers. For the loading and unloading conveyors the carriers are 13 feet, 4 inches apart on their respective chains. The horizontal drying conveyor is 36 feet, 3 inches long and has 90 pusher lugs, spaced 10 inches apart. The empty pole return conveyor is 38 feet, 9 inches long and has six carriers, 3 working and 3 coming up empty, the carriers being spaced 13 feet, 4 inches apart as in the case of the loading and unloading conveyors. It may be determined from a comparison of the distances between carriers and pushers on the respective conveyors that the slow drying conveyor moves sixteen times slower than the other conveyors. In the slow-return conveyors of the prior art approximately one-half of the poles are running empty. In the present device only a small proportion of the poles run empty.

What I claim is:

1. Rug drying means of the character described comprising a right side frame and a left side frame, said side frames standing in parallel, spaced planes, each frame including an upright loading conveyor, an upright unloading conveyor spaced longitudinally from said loading conveyor, and a drying conveyor extending longitudinally and generally horizontally from near the top of the loading conveyor to near the top of the unloading conveyor, means for holding rug-carrying poles transversely between said frames with one end of each pole supported in the left side frame and the other end of each pole supported in the right side frame, and driving means for said conveyors including a motor, left side transmission gearing for the conveyors in said left side frame and carried thereon, right side transmission gearing for the conveyors in said right side frame and carried thereon, means establishing a driving connection between said motor and said left side transmission gearing, and other means establishing a driving connection between said motor and said right side transmission gearing, both said means establishing said connections being outside the space between said frames, and both said driving connection means being independently connected to said motor whereby to avoid the necessity of cross-connecting drive devices extending in bridging fashion between said frames.

2. Rug drying means of the character described comprising a right side frame and a left side frame, said frames standing in parallel, transversely spaced planes, each frame including an upright endless loading conveyor, an upright endless unloading conveyor spaced longitudinally from said loading conveyor, a drying conveyor extending longitudinally and generally horizontally from near the top of the loading conveyor to near the top of the unloading conveyor, and a pole return conveyor also extending longitudinally and generally horizontally from said unloading conveyor back to said loading conveyor, means for holding rug-carrying poles transversely between said frames with one end of each pole supported in the right side frame and the other end of each pole supported in the left side frame whereby each pole is movable on said conveyors successively in such manner that each pole is elevated on said loading conveyors, is carried on said drying conveyors to said unloading conveyors, and after unloading it is returned on said pole return conveyors to said loading conveyors, means for driving said loading conveyors, unloading conveyors and pole return conveyors at the same rate of speed, and means for driving said drying conveyors at a substantially slower rate of speed.

3. Rug drying means of the character defined in claim 2 wherein the means for driving said conveyors at their respective speeds includes a respective speed regulating transmission gearing assembly for each side frame, a single motor, and means establishing driving connections between said motor and each said transmission gearing assembly.

4. Rug drying means of the character described having a pair of spaced side frames standing in generally parallel planes in a drying room, each frame including an upright loading conveyor at one end, an upright unloading conveyor at the other end, a drying conveyor extending from the top portion of the loading conveyor to the top portion of the unloading conveyor and an empty pole return conveyor extending generally parallel with and adjacent the drying conveyor above said upright conveyors, and means for driving said empty pole return conveyor at a rate of speed substantially greater than the rate of speed of the drying conveyor.

5. Rug drying means of the character described having a pair of spaced side frames transversely spaced and standing in generally parallel vertical planes, each frame including an upright loading conveyor at one end, an upright unloading conveyor at the other end, and a drying conveyor extending generally horizontally from near the top of said loading conveyor to near the top of said unloading conveyor, means for driving each said loading conveyor at a relatively fast rate of speed, means for driving each said drying conveyor at a relatively low rate of speed, and means for driving each said unloading conveyor at the same fast rate of speed as said loading conveyor including an endless chain extending from the top of the loading conveyor to the top of the unloading conveyor, said endless chain having thereon, at spaced points, means for returning empty poles from said unloading conveyor to said loading conveyor.

6. In a rug drying apparatus of the character described wherein a rug is suspended from a pole, said pole being carried successively on a first endless conveyor and a second endless conveyor, means for transferring the said pole from the first said conveyor to the second said conveyor comprising a fixed frame, means for moving each said conveyor relative to said frame whereby they pass closely adjacent each other at the transfer point, a transfer member mounted on the frame at the transfer point, a friction clutch normally maintaining said member in fixed indexed position, an axis around which said member may be rotated by an applied off-center force, a pole carrier movable on said second conveyor, a shouldered latch adjacent said member adapted to intercept and temporarily retain a pole arriving on the first conveyor, means on said member adapted to release said latch when said plate is moved, a pole carrier part being adapted to engage and rotate said member to release said latch, a part of said rotating member being simultaneously disposed to move said pole towards said pole carrier when said carrier arrives at the transfer point.

7. Rug drying apparatus of the type defined in claim 6 wherein means in addition to said friction clutch is provided for preventing forward movement of said member from indexed position except when said member is engaged by said pole carrier.

8. Rug drying apparatus of the type defined in claim 6 wherein means in addition to said friction clutch is provided for preventing retrograde movement of said member from indexed position.

9. A rug drying apparatus of the type defined in claim 6 wherein means in addition to said friction clutch is provided for preventing movement of said member from indexed position between predetermined increments of rotation thereof, said means including abutment parts on said rotatable member, and complementary abutment parts on said second conveyor disposed closely adjacent to said first named abutment parts.

10. A rug drying apparatus of the type defined in claim 6 wherein means in addition to said friction clutch is provided for preventing movement of said member from indexed position between predetermined increments of rotation thereof, said means including roller stops on said rotatable member, and articulated links on said conveyor disposed closely adjacent to said roller stops.

11. In a rug-drying apparatus of the character described wherein a rug is suspended from a pole, said pole being carried first on a first conveyor and then transferred to a second conveyor, said conveyors being supported on fixed frame and said conveyors passing closely adjacent to each other at the transfer zone, means facilitating the transfer of said pole from said first conveyor to said second conveyor comprising a pole carrier on said first conveyor, a pivoted latch carried on said frame near said transfer point, said latch lying in the path of travel of said pole on said first conveyor but permitting unidirectional movement of said pole thereby, and means for clearing said pole from said pole carrier including a cam member fixed on said frame beyond said latch, said cam having a cam track portion inclined towards said second conveyor whereby contact of said pole with said cam track directs said pole onto said second conveyor.

12. Rug drying apparatus of the character defined in claim 11 wherein said pole carrier is provided with two spaced fingers affording therebetween a crotch in which said pole is carried on said first conveyor, the rear said finger with relation to conveyor travel being inclined in a direction to assist in pole impulsion in the direction of the second conveyor when the pole is cammed out of said pole carrier.

13. In rug drying means of the character described wherein a rug to be dried is suspended from a rug-carrying pole, said pole being supported at its opposite ends on respective right and left side frames, and wherein each such side frame is provided with respective conveyors for moving said poles from a loading station to an unloading station, driving means for said conveyors comprising a motor, a first means establishing a first driving connection between said motor and said right side conveyors, a second means establishing a second driving connection between said motor and said left side conveyors, both said means independently establishing said first and second driving connections being outside the space between the frames whereby to avoid the necessity of bridging means or cross-connecting drive devices extending between said frames.

References Cited in the file of this patent
UNITED STATES PATENTS

| | | |
|---|---|---|
| 322,765 | Waldron | July 21, 1885 |
| 322,871 | Waldron | July 21, 1885 |
| 602,375 | Suydam | Apr. 12, 1898 |
| 877,938 | Marr | Feb. 4, 1908 |
| 1,460,448 | Shampay | July 3, 1923 |
| 1,557,422 | Colbert et al. | Oct. 13, 1925 |
| 1,700,300 | Greene | Jan. 29, 1929 |
| 1,709,788 | Greene | Apr. 16, 1929 |
| 1,728,283 | Fisher | Sept. 17, 1929 |
| 1,815,967 | Caps | July 28, 1931 |
| 1,832,204 | Healy | Nov. 17, 1931 |
| 2,555,880 | Fruechtel | June 5, 1951 |
| 2,667,963 | Rittinger | Feb. 2, 1954 |